United States Patent [19]

Fost

[11] 4,293,436

[45] Oct. 6, 1981

[54] AUTOFLUOROGRAM AND COMPOSITION AND METHOD FOR MAKING THE SAME

[75] Inventor: Dennis L. Fost, Franklin, Mass.

[73] Assignee: New England Nuclear Corporation, Boston, Mass.

[21] Appl. No.: 25,653

[22] Filed: Mar. 30, 1979

[51] Int. Cl.$^3$ .............................................. C09K 11/06
[52] U.S. Cl. ........................... 252/301.1 R; 23/230.3; 250/303; 252/301.17; 252/408; 424/1.5
[58] Field of Search ................. 252/301.1 R, 301.1 L, 252/301.17, 408; 250/303; 23/230.3; 424/1.5

[56] References Cited

U.S. PATENT DOCUMENTS 3,928,227  12/1975  Sena et al. ..................... 252/301.1 L
3,999,070  12/1976  Tarkkanen ..................... 252/301.17

FOREIGN PATENT DOCUMENTS 274475  9/1970  U.S.S.R. .............................. 250/303

OTHER PUBLICATIONS

Rost et al., "New Methods for the Histochemical Demonstration of Catechol Amines, Tryptamines, Histamine, and Other Arylethylamines by Acid- and Aldehyde-Induced Fluorescence", *Chem. Abs.* 76: 11722g, (1972).
Bonner et al., "Film Detection Method for Tritium-Labeled Proteins and Nucleic Acids in Polyacrylamide Gels", *Chem. Abs.* 81: 101519d, (1974).
Laskey et al., "Quantitative Film Detection of Tritium and Carbon-14 in Polyacrylamide Gels by Fluorography", *Chem. Abs. 83: 128429c, (1975).*

*Primary Examiner*—Deborah L. Kyle
*Attorney, Agent, or Firm*—Sewall P. Bronstein

[57] ABSTRACT

An improved method of enhancing the effect of weak, e.g. beta, radioactive emitters, such as tritium and carbon-14, on film by contacting the medium used to contain the radioactive emitter with a fluor dissolved or dispersed in a carboxylic acid.

A new composition of matter for performing such a method, comprising a fluor dissolved or dispersed in a carboxylic acid.

An article of manufacture comprising an aqueous separation medium impregnated with a fluor and a solvent.

38 Claims, No Drawings

AUTOFLUOROGRAM AND COMPOSITION AND METHOD FOR MAKING THE SAME

BACKGROUND OF THE INVENTION

1. Field of the Invention

The invention relates to the field of autoradiography and, more particularly, (1) to a practical, economical, and sensitive method of intensifying the effect of weak, e.g. beta, radioactive emitters, such as tritium and carbon-14, on film, (2) to a new composition of matter for carrying out the aforesaid method and (3) to the resulting autoradiogram.

2. Description of the Prior Art

When first used, the process of autoradiography depended principally on the direct action of the radiation from radioactive materials on the radiation-sensitive chemical particles embedded in the film's emulsion to provide a photo, e.g. x-ray photo, when a layer or plate containing such radioactive materials is sandwiched against the emulsion and the sandwich is exposed.

The relatively short range of penetration of weak, e.g. beta, radioactive emitters, such as tritium, requires an exceedingly and impractically long exposure time and gives poor resolution particularly when the layer containing the radioactive materials is relatively thick, as in the case of polyacrylamide electrophoresis gels which are commonly used in autoradiography.

On the other hand, this very property of weak radioactive emitters makes them safer and, hence, highly desirable for use in autoradiography.

Also, these weak emitters are the preferred radionuclides for chemical combination in organic compounds for many labelling and tracing purposes.

The detection and measurement of these low energy nuclides have been dramatically improved in the general field of radioactivity measurement with the development of highly sensitive instrumentation and with the increased use of systems utilizing scintillators or fluors, in which the radiation stimulates or excites the scintillator, resulting in light flashes or emissions sufficiently long lived to be measured and not hindered by the matter, e.g. polyacrylamide gel, through which they must travel before being detected.

This technique has been applied to autoradiography. Although called autoradiography in the broad sense, a more appropriate name is autofluorography because the radioactivity is converted to light emissions by the scintillator fluor and it is these light emissions that are photographed to give the desired measurement. It is the intensity of the light transmitted to the photographic film, which is measured to indicate the amount of radioactivity thereby indicating, e.g. the purity or amount of a radioactive component or the condition of animal tissue.

In the case of chromatography and electrophoresis, the radioactive material to be measured is absorbed or adsorbed according to conventional techniques on or in an organic or inorganic absorbent or adsorbent layer or column of material, e.g. silica gel, alumina, cellulose, polyamide, polyacrylamide, cross-linked dextran, agarose, etc., which is usually supported on a plate, e.g. glass or plastic sheet. This is called a chromatogram or electrophoretogram. In the case of radioactive labelled animal tissues, e.g. tissue autoradiography, the radioactive material is usually administered to the live animal and becomes selectively absorbed or adsorbed into certain tissues so that the tissue, usually in the form of a thin slice, may be considered as the absorbent or adsorbent layer. In the case of paper chromatography the paper (cellulose) is the adsorbent.

Where the adsorbent material is in the form of a thin layer supported on a plate, it is called thin layer chromatography and a thin layer chromatogram.

Conventionally, the photograph is taken with the radioactive sample sandwiched against the emulsion of the film.

Thus, in autoradiography (in its narrow sense), the radioactivity of the material being tested is measured by a film sensitive to radioactivity.

In autofluorography, a fluor or scintillator, which is excited or stimulated by radioactivity to emit light, is applied in close proximity to the radioactive material and the intensity of light emission is measured by a photographic film, which is sensitive to light.

Autofluorography has important advantages over conventional autoradiography, the most important of which is a markedly shorter exposure time (typically shortened from two weeks to 16 to 24 hours) with weak radioactive emitters, such as tritium.

However, in spite of this important advantage, presently known autofluorographic techniques have serious disadvantages, particularly in systems where relatively thicker layers of absorbent or adsorbent materials are used in the separation process, e.g. polyacrylamide gel electrophoresis which is frequently used in receptor site, nucleic acid, and enzyme research.

One of the problems is developing a method for placing and maintaining the scintillator fluor in close proximity to the radioactive emitter. If not in close proximity, a portion of the emitted radioactive particles will not reach the scintillation fluor. In the case of thin layer chromatography, the scintillaor fluor can be dissolved in a suitable carrier, e.g. benzene or toluene, and then sprayed onto the thin layer separation medium, e.g. a paper strip, containing the radioactive sample. After drying, a piece of film sensitive to the light emission of the scintillator is then juxtaposed and this sandwich is allowed to stand for a time sufficient to achieve exposure. In such a system, it is difficult to evenly distribute the scintillator fluor, the radioactive material may spread and diffuse, and the small crystals of scintillator fluor tend to be so loosely bound that great care must be exercised in handling the sample.

In additon to the above disadvantages, it is sometimes desirable to use thicker layers of adsorbent or absorbent material. Once any appreciable thickness is used, i.e. greater than about 0.1 mm, the technique of spraying no longer places the scintillator fluor in close enough proximity to enough of the radioactive material with a drastic loss in the ability of the scintillator fluor to be excited by the emitted particles and convert them into light.

Accordingly, it is necessary to somehow transport the scintillator fluor into the interior of the separation medium. One method for accomplishing this transportation is by soaking the separation medium of absorbent or adsorbent material in a bath containing the scintillation fluor dissolved in a suitable carrier.

Two of the most common separation media used in electrophoresis are aqueous polyacrylamide and agarose gels. Gel electrophoresis is a method of separating charged particles, such as proteins, whereby the charged particles move through a gel medium under the influence of an applied electric field, their rate of movement through the lattice formed by the hydrated gel being dependent on charge and molecular size or weight. When the electric field is removed, the particles are present in the gel in discrete bands which can either be sliced up for liquid scintillation counting, or in the case of radionuclides such as tritium which emit lower energy particles, more preferably analyzed by autofluorography.

The technique now used most often to prepare polyacrylamide gels for autofluorography is described in Bonner and Laskey, *Eur. J. Biochem.*, Vol. 46, pages 83–88, 1974, incorporated hereinby reference. In that method the radioactively-labelled protein is separated by electrophoresis using an aqueous polyacrylamide gel, followed by soaking the gel in about 20 times its volume of dimetylsulfoxide (DMSO) for 30 minutes, and then immersed a second time for 30 minutes in fresh DMSO to displace all the water from the gel. The next step is to soak the gel in a 20% (w/w) solution of 2,5-diphenyloxazole (PPO) in DMSO to impregnate the gel with scintillator which is then precipitated in the gel by washing with water. The gel is finally dried and exposed to the film. This technique has numerous disadvantages, many of which are reported in the appendix of an article by Laskey and Mills in the *Eur. J. Biochem.*, at Vol. 56, pages 335–341, 1975, incorporated herein by reference. Agarose gels containing less than 2% polyacrylamide (plus 0.5% agarose) or agarose alone dissolve in DMSO unless methanol is substituted for the DMSO. Even this substitution is only effecive for gels having less than 2% polyacrylamide, since gels having higher concentrations of polyacrylamide shrink severly when contacted with methanol. Even at 30% methanol, shrinkage of higher polyacrylamide concentration gels may take place. Another disadvantage is that the failure to remove all the DMSO may result in adhesion of the film to the gel and artefactual blackening of the film. Another disadvantage is the ability of DMSO to penetrate through the skin of anyone handling it by itself or the gel which has been soaked in it, thereby carrying dissolved material with it through the skin as well as imparting a garlic smell to the person's breath. Another disadvantage is that the gels must be soaked in the DMSO-fluor solution for as much as 3 hours to obtain complete impregnation. A further disadvantage is that high concentrations of PPO, concentrations between 14% and 19% (w/w) being typical, must be used in the impregnation solution. Another disadvantage with DMSO as well as with other conventional carriers is that while PPO is efficient in converting absorbed radiation into photons of light, it is somewhat limited in its ability to absorb the energy emitted by the radioactive emitter. Another disadvantage is that the soakings in DMSO to dehydrate the gel are time-consuming.

One method for increasing the absorption ability of PPO when thin layer chromatography is being employed is described in Bonner and Stedman, *Analytical Biochemistry*, Vol. 89, pages 247–256, 1978, incorporated herein by reference. Three methods for detection of $^3H$ and $^{14}C$ in silica gel thin layer chromatograms are described in that article. The first method utilizes 2-methylnaphthalene (2MN) which is described as being a scintillation solvent for use in solid systems by analogy to scintillation fluids which many times contain a solvent in addition to the scintillator. As in liquid systems, the solvent molecules collect the energy from the emitted beta radiation and transfer it to PPO molecules, which then emit photons of light. A solvent is a compound which converts the kinetic energy radiated by the radioactive emitter to electronic excitation energy and transfers that energy to the fluro dissolved therein. The first method comprises dipping the dried thin layer plates in a solution of 2MN which has been liquified by heating and which contains 0.4% (w/v) of PPO, until they are soaked and then removing the plates from the solution. When the solution has solidified, the plate is placed against film and exposed. An alternative, if spraying is deemed to be more desirable, is to replace 10% of the 2MN with toluene to make the solution a liquid at room temperature. The second method involves dipping the plates in an ether solution containing between 7% and 30% (w/v) of PPO, drying the plates and then exposing as above, with better sensitivity being seen as the PPO concentration increases. The third method involves dipping the thin layer plates in melted PPO until soaked, removing and then heating until the excess PPO has drained off, and exposing to film as above. While useful in thin layer chromatography, numerous problems exist in attempting to use such systems with other media, e.g. One problem is that neither PPO nor 2MN is soluble nor miscible in water to any appreciable extent. Accordingly aqueous polyacrylamide or agarose gels are not impregnated with PPO nor 2MN while in the hydrated state, nor even if dried since the lattice structure collapses upon drying. Secondly, PPO and 2MN are very expensive even if it were possible to use them in such systems. The second method also is not useful with aqueous gels since ether and similar solvents such as alcohols cause drastic shrinkage of such gels. Furthermore, relatively high (7% to 30%) concentrations of expensive PPO in the ether are required for efficient fluorography.

SUMMARY OF THE INVENTION

The present invention provides a highly sensitive and efficient autofluorographic technique, particularly, for weak radioactive emitters, such as tritium and carbon-14, in which the aforesaid disadvantages are avoided, in wih greater intensities and greater and more uniform sensitivities and resolution are more consistently achieved, as compared to the aforesaid known techniques, and which is economical, practical, and highly versatile in that it can be used equally as well with most of the common radioactive materials and scintillator fluors and with most of the common aqueous chromatograms, electrophoretograms, and animal and plant tissues.

This is achieved in accordance with the invention by impregnating the aqueous separation medium or animal or plant tissue with a water-soluble or water-miscible lower alkyl carboxylic acid in which a scintillator fluor has been dissolved or dispersed, followed by precipitation of the fluor within the gel or tissue by aqueous soaking.

The present invention not only contemplates (1) the aforesaid method of impregnating the absorbent or adsorbent medium, but also contemplates (2) the aforesaid solution or dispersion of fluor in a carboxylic acid, and (3) the chromatogram, electrophoretogram and animal or plant tissue impregnated with the fluor-carboxylic acid solution or dispersion referred to above.

Preferably, the fluor-carboxylic acid solution or dispersion also contains a solvent to enhance the action of the fluor. By using a solvent in combination with the fluor, it is possible to reduce the amount of fluor used much below the levels previously required without significantly reducing the amount of light emitted by the fluor. Preferably the solvent per se is a solid at room temperature to avoid diffusion of the radioactive-containing spots or bands.

When using aqueous gels, it is preferred that the fluor-carboxylic acid solution also contain a water soluble alcohol, ether, glycerol or alkoxy alcohol to reduce or eliminate the small amount of swelling which is sometimes seen when carboxylic acid is used.

It is highly preferred to carry out the exposure of the impregnated chromatogram or electrophoretogram or tissue at low temperatures, preferably between −30° and −100° C. and, more preferably, between −60° C. and −80° C.

DETAILED DESCRIPTION OF THE INVENTION

The carboxylic acid used in the present invention should be water soluble or water miscible, chemically inert to the fluor, and one in which the fluor is soluble. Since the function of the carboxylic acid and the solution thereof is to carry the fluor into the interior of the aqueous gel, it should be one which will displace water. In addition, it should preferably be a liquid at ambient temperature to allow the gel to be immersed in it at ambient temperature. Preferred carboxylic acids within the above description are lower aliphatic (one to five carbons, preferably one to three), which may optionally be substituted by halogen, hydroxyl, alkoxyl of one to three carbons, or carboxyl. Particularly preferred is acetic acid.

The fluor may be any of those which efficiently collect the radiation from the radioactive labelled compound and emit a wave length corresponding to that to which the photo emulsion is most sensitive, which is soluble in the carboxylic acid and essentially insoluble in water, and is chemically inert to the carboxylic acid, radioactive material, and the gel. Preferred fluors are those which have a high quantum efficiency, i.e. those which are efficient in converting received radiation into light. Preferred fluors are 2,5-diphenyloxazole (PPO), isopropyl phenyl biphenylyloxadiazole (isopropyl PBD), 2-[napthyl-(1')]-5-phenyloxazole (α-NPO), t-butyl phenyl biphenylyl oxadiazole (butyl PBD), p-quarterphenyl, or diphenyl acetylene. When used in combination with a solvent as described below and X-ray film it is preferred that the fluor absorb at a wavelength between about 270 and about 330 nm and emit between about 340 and about 400 nm. It is preferred that the fluor be a solid at ambient temperature to prevent oiling and possible spreading of the band when the fluor is precipitated in the gel. However, the impregnation may be performed in a cold room if it is desired to use fluors which are liquids or oils at ambient temperatures.

Preferably, the carboxylic acid will also contain a solvent, a compound which collects the energy from the radioactive labelled compound and transfers it to the fluor, which then emits photons of light. While many of the solvents useful in the present invention may also be fluors, it is their ability to convert the kinetic energy received from the radioactive emitter to electronic excitation energy and transfer that energy to the fluor which is the desired property sought. Such solvents are well known in the prior art such as those described in U.S. Pat. No. 3,068,178 incorporated herein by reference, wherein the solvents are referred to as "intermediate solvents." The solvent should dissolve the fluor, be soluble in the carboxylic acid, essentially insoluble in water, and be chemically inert to the fluor, carboxylic acid, radioactive material, and the gel. It is preferred that the solvent be a solid when precipitated at ambient temperature, but the impregnation may be carried out in a cold room if it is desired to use solvents which are solids only at lower temperatures. Preferred solvents are 2-methylnaphthalene 1-methylnaphthalene, naphthalene, anthracene and fluorene.

Although not preferred, where the photo film emulsion is sensitive to wave lengths other than that of the primary fluor, secondary fluors (spectrum shifters) may also be present with the primary fluor, such as p-bis-[2-(4-methyl-5-phenyloxazoyl)]benzene (called dimethyl POPOP), or p-bis-(o-methylstyryl) benzene (called bis-MSB), p-p'diphenyl stilbene, 9,10 diphenyl anthracene, POPOP, and dibiphenylyloxazole (BBO). These secondary fluors are excited by the wave length emitted from the primary fluors to emit the wave length to which the photo emulsion is most sensitive to provide a high efficiency. A possible fluor combination is a mixture of PPO and bis-MSB; also a mixture of PPO and POPOP or dimethyl POPOP.

The important thing is that the fluor have a wave length to which the photographic emulsion used is sensitive.

When the carboxylic acid is used alone slight swelling of the gel is sometimes seen. To inhibit this swelling, it is preferred that the composition also contain a swelling inhibitor, i.e. a compound which dilutes the carboxylic acid and tends to shrink the gel to offset the swelling caused by the carboxylic acid, thereby reducing or eliminating the swelling. The swelling inhibitor should be chemically inert to the radioactive labelled compound, fluor, solvent, gel, and carboxylic acid. It should preferably be a liquid at ambient temperature, and should be soluble or miscible in the carboxylic acid solution. Furthermore the fluor and solvent should be soluble in the swelling inhibitor. The swelling inhibitor is preferably a compound of intermediate polarity such as a lower alkyl alcohol (one to five carbons, preferably one to three), a lower alkyl (one to six carbons, preferably one to three) ether, a lower alkyl (one to six carbons, preferably one to three) glycerol, or an alkoxy (one to three carbons) lower alkyl (one to five carbons, preferably one to three) alcohol. A particularly preferred swelling inhibitor is 2-ethoxyethanol.

Commercially available fluors and solvents sometimes have impurities which may cause decomposition during storage such as yellowing etc. To prevent or inhibit this, it is preferred that the composition contain an antioxidant. Any antioxidant inert to the other ingredients in the composition may be employed, a preferred antioxidant being butylated hydroxytoluene (BHT).

Finally, since many of the potential fluors and solvents have disagreeable odors, a suitable commercially available masking agent which is inert to the gel, the radioactive labelled compound, and the other components of the solution, may be incorporated.

A carboxylic acid concentration of between 47.5% and 95% (w/w), preferably between 60% and 70% (w/w), has been found satisfactory. When used in conjunction with a swelling inhibitor, it is preferred that the concentration be that at which the gel being treated neither swells nor shrinks while in contact with the solution.

The fluor may be present in concentrations between about 0.01% (w/w) and the maximum concentration which can be dissolved in the carboxylic acid or carboxylic acid-swelling inhibitor solution. It is preferred that the concentration be between about 0.05% and about 20% (w/w) and more preferably between about 4% and about 6% (w/w). In contrast to the prior art, it has been found that the efficiency is affected only slightly by decreasing the fluor concentration until a concentration of about 5.0% (w/w) is reached.

The solvent may be present in concentrations between about 0.1% (w/w) and the maximum concentration which can be dissolved in the carboxylic acid or carboxylic acid-swelling inhibitor solutions. It is preferred that the concentration be between about 2% and about 20% (w/w), and more preferably between about 4% and about 6% (w/w). When a solvent is included as a part of the solution, it is preferred that the fluor concentration be reduced by the amount of solvent added. Accordingly the concentration of fluor plus solvent is preferably between about 2% and about 20% (w/w), and more preferably between about 4% and about 6% (w/w). In such a combination, the ratio of solvent to fluor is from about 10:1 to about 50:1, it being preferred that as little fluor as possible be used.

When a secondary fluor is used, the ratio of primary fluor to secondary fluor is typically in the range from about 100:1 to 5:1, depending on the particular fluors.

The swelling inhibitor is preferably substituted for a portion of the carboxylic acid to prevent the carboxylic acid from significantly swelling or shrinking the gel being treated. The concentration of swelling inhibitor is preferably between about 1% and 47.5% (w/w); and more preferably between about 20% and 35% (w/w). It is preferred that as little swelling inhibitor be used as possible since increasing concentrations of swelling inhibitor appear to decrease the amount of fluor and solvent impregnated within the gel.

The antioxidant is added in an amount sufficient to retard the decomposition process, e.g. from about 0.005% to about 0.2% (w/w).

The masking agent is added in an amount sufficient to reduce or hide the undesirable odor of the solution, and is typically present in concentrations between about 0.05% and 0.5% (w/w).

Conventional methods of preparing tissue slices in tissue microscopy are well known in the prior art. Once the tissue slice has been prepared, it is treated in the same manner as a gel.

Although the invention is applicable to any radioactive material, it is particularly useful for weak, low intensity alpha and beta radioactive emitters, such as tritium, carbon-14 and sulfur-35.

There are literally thousands of different organic compounds which are radioactively labelled and with which the present invention can be used. Accordingly, there is nothing to be gained by listing them.

The invention will be further clarified by a consideration of the following examples, which are intended to be purely exemplary of the use of the invention.

EXAMPLE I

An electrophoretogram was prepared in conventional manner with a 1.5 mm thick polyacrylamide gel slab having a 7.5% to 20% linear acrylamide gadient on a sheet of Gelbond, a commercially available mylar plastic sheet with a hydrophilic coating, sold by Marine Colloids of Rockford, Maine. A solution containing $^3$H-containing proteins to be analyzed obtained by translation of messenger ribonucleic acid extracted from adenovirus-2 infected HeLa culture cells using rabbit reticulocyte lysate and $^3$H-leucine tracer (110 Ci/mmol) sold under the designation NET-460 by New England Nuclear of Boston, Mass. were deposited in the gel slab and subjected to electrophoresis in accordance with techniques well known in the prior art using a constant current power supply set at 20 mA.

The radioactive labelled protein was carried through the gel lengthwise at a rate dependent principally upon molecular size. The different molecular sized proteins separated into discrete bands as they moved through the gradient, with each of the bands having an intensity proportional to the amount of labelled protein contained therein.

After electrophoresis, the gel was soaked overnight in an aqueous solution containing 10% (w/v) of trichloroacetic acid, 10% (v/v) of glacial acetic acid, and 30% (v/v) of methanol to fix the proteins in the gel. In another example identical to this one, the gel was soaked for only one hour with comparable results. Although it is preferred that the proteins be fixed in the gel in this manner, this step may be skipped in which case the gel would be transferred directly from the electrophoresis to the solution described in the next paragraph.

A solution was formed containing 67% (w/w) of glacial acetic acid, 28% (w/w) of 2-ethoxyethanol, 4.9% (w/w) of 2-methylnaphthalene (2MN), and 0.1% (w/w) of 2,5-diphenyloxazole (PPO).

The gel was soaked for one hour in this solution and then soaked for one hour in distilled water to precipitate the 2MN and the PPO within the gel, and thus in close contact with the radioactive labelled protein. The precipitation turned the gel opaque, but had little or no effect on the autofluorographic efficiency. While it is sufficient to use only enough of the fluor-containing solution to cover the gel, it is preferred that at least three times the gel volume be used.

The slab was dried using a commercially available slab gel dryer using Whatman #1 filter paper as backing.

When completely dry, the gel was sandwiched against Kodak XR-5 X-OMat R Film and exposed at $-76°$ C. for 24 hours and then developed using standard procedures for X-ray film. The light emission from the fluor caused by excitation of the beta radiation from the tritium in the tritium labelled proteins showed up as black bands, the intensity and size of which were dependent on the intensity and size of the radioactive bands, which, in turn, are a measure of the concentration of the particular radioactive labelled protein which collected in each band.

Comparative testing demonstrated that prior art impregnating solutions of PPO in DMSO require a soaking time of 3 hours to obtain optimum results whereas the impregnating solution of the present invention requires only a one hour soaking time for optimum results. If the soaking time is reduced to a half an hour for the respective compositions, the present invention shows twice the enhancement of the prior art. At a one hour soaking time for the respective compositions, the present invention shows 10–15% more enhancement than the prior art.

While the present invention has been described in conjunction with relatively thicker separation media, it can also be used in thin layer chromatography if desired. The solution might also be applied by spraying in such applications.

While the method of the present invention has been described as being performed on media with the radioactive sample already deposited therein, it is also possible to treat the medium by the method prior to depositing the sample therein. Such a pretreatment would be performed by soaking the medium in the carboxylic acid or carboxylic acid-swelling inhibitor solution containing the fluor or fluor and solvent and then precipitating the fluor or fluor and solvent by contacting the medium with water. The pretreated gel can then be either stored as is or dried and reconstituted for use as a separation medium at a later time. This is in contrast to prior art methods of treatment which largely destroy the ability of the treated medium, especially agarose, to be used for separation purposes.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. A method of impregnating an autofluorographic medium for use in an autofluorographic method comprising impregnating an absorbent or adsorbent autofluorographic medium with at least 0.01% by weight of a fluor in a solution having between 47.5 and 95% by weight of a water-soluble or water-miscible carboxylic acid carrier.

2. A method of enhancing the autofluorographic effect on film of radioactive emitters contained within an absorbent or adsorbent medium comprising contacting said medium with a mixture comprising at least 0.01% by weight of a fluor dissolved or dispersed in between 47.5 and 95% by weight of a water-soluble or water-miscible carboxylic acid to disperse said fluor throughout said medium, and precipitating said fluor within said medium.

3. The method of claim 2 in which said medium is contacted with said fluor in said carboxylic acid for a period of less than three hours.

4. The method of claim 2 in which said carboxylic acid is a lower alkyl carboxylic acid.

5. The method of claim 2, in which said carboxylic acid is acetic acid.

6. The method of claim 2 in which said fluor is present in a concentration between about 0.05% and about 20% by weight.

7. The method of claim 2 in which said fluor is 2,5-diphenyloxazole.

8. The method of claim 2, wherein said mixture further includes, at least 0.01% by weight of a scintillation solvent.

9. The method of claim 8 in which said solvent is 2-methylnaphthalene.

10. The method of claim 8 in which said solvent is present in a concentration between about 0.1% and about 20% by weight.

11. The method of claim 8 in which the fluor and solvent are present in combination in a concentration between about 0.1% and about 20% by weight, and the ratio of said solvent to said fluor is from about 10:1 to about 50:1.

12. The method of claim 2 or 8 wherein said mixture further includes a swelling inhibitor in a concentration sufficient to reduce swelling or shrinking of said medium.

13. The method of claim 12 in which said swelling inhibitor is present in a concentration between about 1% and about 47.5% by weight.

14. The method of claim 12 in which said swelling inhibitor is 2-ethoxyethanol.

15. The method of claims 1 or 2 in which said medium is a solid aqueous medium.

16. The method of claim 15 in which said aqueous medium is agarose, polyacrylamide, or agarose-polyacrylamide gel.

17. A composition of matter comprising at least 0.01% by weight of a fluor in a solution having between 47.5 and 95% by weight of a water-soluble or water-miscible carboxylic acid carrier.

18. The composition of claim 17 in which said carboxylic acid is a lower alkyl carboxylic acid.

19. The composition of claim 17 in which said carboxylic acid is acetic acid.

20. The composition of claim 17 in which said fluor is present in a concentration between about 0.05% and about 20% by weight.

21. The composition of claim 17 in which said fluor is 2,5-diphenyloxazole.

22. The composition of claim 17 including in addition, at least 0.01% by weight of a scintillation solvent.

23. The composition of claim 22 in which said solvent is 2-methylnaphthalene.

24. The composition of claim 22 in which said solvent is present in a concentration between about 0.1% and about 20% by weight.

25. The composition of claim 22 in which said fluor and said solvent are present in combination in a concentration between about 0.1% and about 20% by weight, and the ratio of said solvent to said fluor is from about 10:1 to about 50:1.

26. The composition of one of claims 17 to 22 including in addition a swelling inhibitor in a concentration sufficient to prevent an absorbent or adsorbent autofluorographic medium from significantly swelling or shrinking.

27. The composition of claim 26 in which said swelling inhibitor is present in a concentration between about 1% and about 47.5% by weight.

28. The composition of claim 26 in which said swelling inhibitor is 2-ethoxyethanol.

29. An autofluorogram comprising an absorbent solid aqueous separation medium impregnated with the composition of one of claim 17 or 22.

30. The autofluorogram of claim 29 in which said medium is a polyacrylamide, agarose, or agarose-polyacrylamide gel.

31. The autofluorogram of claim 29 in which said medium contains less than about 5% by weight of fluor.

32. A radioactive labelled animal or plant tissue impregnated with the composition of one of claims 17, 22, or 26.

33. An article of manufacture comprising a solid aqueous separation medium impregnated with the composition of one of claims 17 or 22.

34. The article of claim 33 in which said medium is a polyacrylamide, agarose, or agarose-polyacrylamide gel.

35. The article of claim 33 in which said medium contains less than about 5% by weight of fluor.

36. An autofluorogram comprising an absorbent solid aqueous separation medium impregnated with the composition of claim 26.

37. A radioactive labelled animal or plant tissue impregnated with the composition claim 26.

38. An article of manufacture comprising a solid aqueous separation medium impregnated with the composition of claim 26.

* * * * *

UNITED STATES PATENT AND TRADEMARK OFFICE
CERTIFICATE OF CORRECTION

PATENT NO. : 4,293,436
DATED : October 6, 1981
INVENTOR(S) : Dennis Lynn Fost

It is certified that error appears in the above-identified patent and that said Letters Patent are hereby corrected as shown below:

Col. 4, line 2, change "fluro" to read ---fluor---.

line 21, after "e.g." insert ---polyacrylamide gel slabs, and relatively thicker separation media---.

line 40, change "wih" to read ---which---.

Col. 7, line 61, change "gadient" to read ---gradient---.

Signed and Sealed this

Fourth Day of October 1983

[SEAL]

Attest:

Attesting Officer

GERALD J. MOSSINGHOFF
Commissioner of Patents and Trademarks